United States Patent [19]

Moorcroft

[11] Patent Number: 4,464,739
[45] Date of Patent: Aug. 7, 1984

[54] SAMPLED TOWED ARRAY TELEMETRY

[75] Inventor: Arthur L. Moorcroft, Norwich, Conn.

[73] Assignee: The United States of America as represented by the Secretary of the Navy, Washington, D.C.

[21] Appl. No.: 402,016

[22] Filed: Jul. 26, 1982

[51] Int. Cl.$^3$ .............................................. G01S 3/80
[52] U.S. Cl. .................................... 367/130; 367/20; 367/129
[58] Field of Search ................... 367/20, 79, 106, 129, 367/130

[56] References Cited

U.S. PATENT DOCUMENTS 3,905,008 9/1975 Hagemann .......................... 367/130
4,170,766 10/1979 Pridham et al. .................... 367/130

Primary Examiner—Richard A. Farley
Attorney, Agent, or Firm—Robert F. Beers; Arthur A. McGill; Michael J. McGowan

[57] ABSTRACT

A system for detecting and identifying acoustic sound sources using a plurality of identical data acquisition modules spaced at preselected intervals along a line array. Two small diameter coaxial cables provide intermodular connections for power, timing control and sequential data transmission to a remote receiver. A control clock waveform leading edge simultaneously triggers sampling and holding of sensor data at each module of the array while the waveform trailing edge is delayed for a preselected interval at each module to provide squential data output.

6 Claims, 4 Drawing Figures

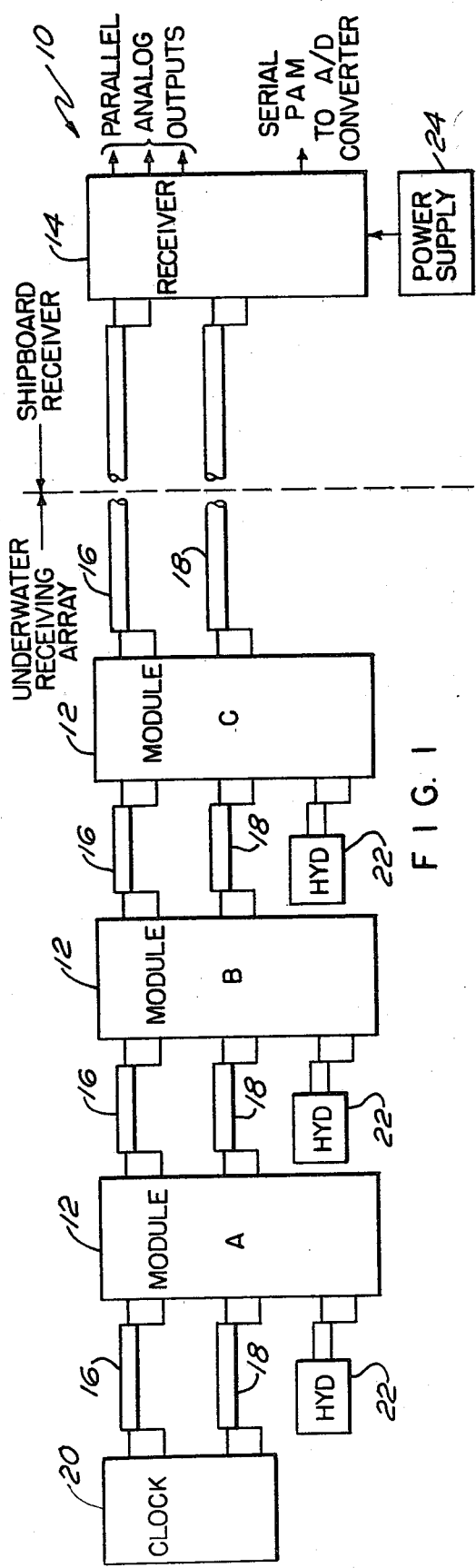
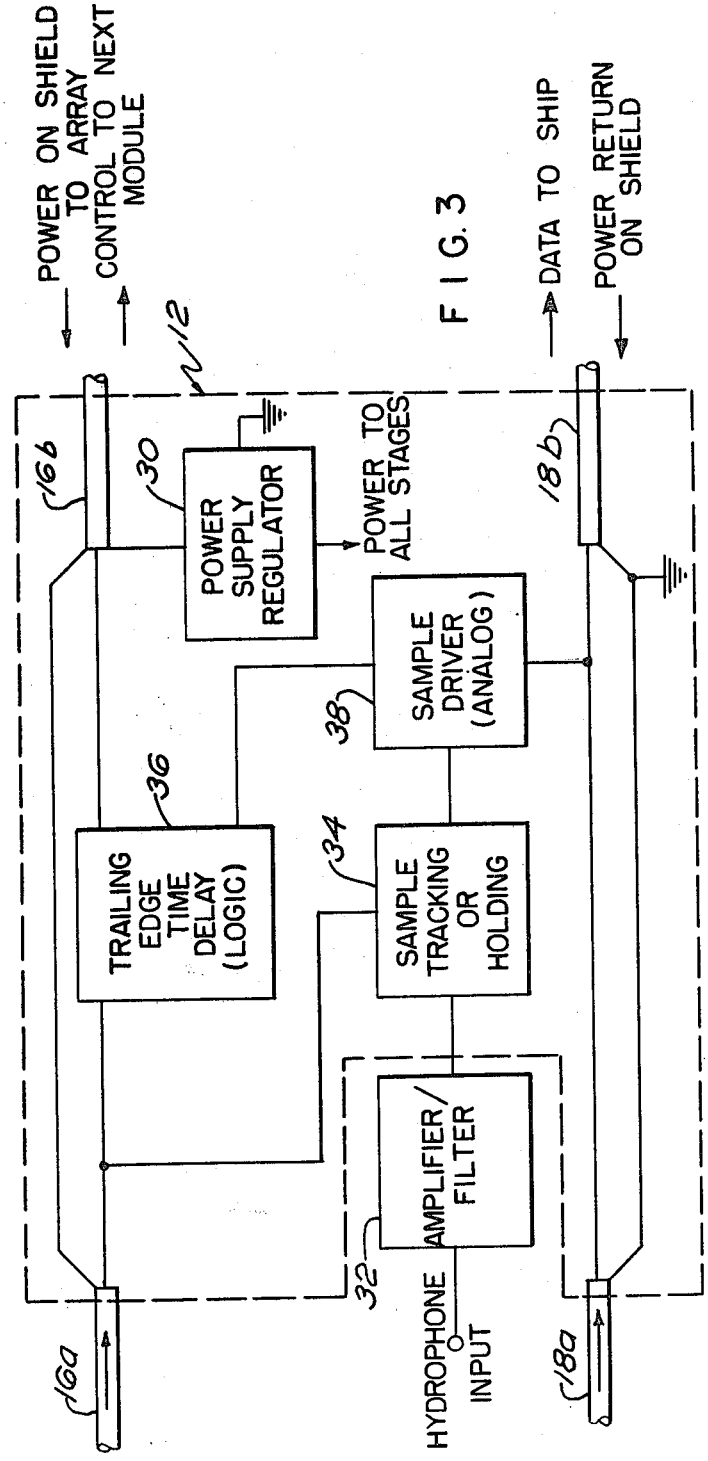
FIG. 1
FIG. 3

SAMPLED TOWED ARRAY TELEMETRY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to telemetry for sampling individual receiving modules of a towed array and more particularly to a system which utilizes only two coaxial cables and a plurality of identical receiving modules to construct a low cost, expendable, small diameter towed array.

(2) Description of the Prior Art

Presently used towed acoustic receiving arrays are very costly; normally use a complex telemetry system with a unique data acquisition telemetry module for each channel of data; are relatively large in diameter (2-3 inch) which causes storage, deployment and retrieval problems; typically use flammable fill fluid to achieve neutral buoyancy and to help dissipate internal heat; and usually require relatively high electrical power (1 watt or more) per array acoustic channel. Recovery of an array's many separate channels of acoustic data is necessary to improve array sensitivity and directivity in conjunction with modern array signal processing.

Multichannel telemetry data can be coded in many ways depending on the data bandwidth, the signal dynamic range, the number of channels required, and the telemetry cable limitations. Digital, analog and hybrid telemetry methods are presently used. A digital time division multiplexed format allows telemetry of many channels with wide dynamic range to be coupled as necessary over a distance of many thousands of meters using digital repeaters. However, the data cable must be larger in diameter to allow passage of the relatively wide telemetry signal bandwidth. In addition, power per channel tends to be high due to high speed clocking requirements. To maintain channel identity, a different address number is normally assigned to each channel. Unless a separate plug-in address module is used, this requirement limits interchangeability.

To convey acoustic information, analog multichannel carrier techniques use either frequency modulation (FM) or amplitude modulation (AM) of high frequency carriers. A single cable can pass up to approximately 20 FM channels before carrier drift and crosstalk become a problem. AM-FM techniques can carry more data by bandshifting groups of modulated carrier data, but circuit complexity and power increase and extremely linear repeaters are usually required to prevent harmonic distortion interference. Amplitude modulation allows more channels to exist in a given limited cable bandwidth, especially if one of several single sideband methods are used; however, the received signal level varies inversely with the cable length and low frequency response is usually poor due to the modulation limitations. Both FM and AM methods require that each data acquisition module must operate at a unique carrier frequency; therefore, particular module sparing and repairing problems arise.

SUMMARY OF THE INVENTION

Accordingly, it is a general purpose and object of the present invention to provide a telemetry system for transmitting electrical signal representing acoustical signals received by a line array. It is a further object that the telemetry system require only two coaxial cables in order to function. Another object is that the array operate at low power. Still another object is that telemetry modules along the array be identical and thus interchangeable. A still further object is that by so combining analog and digital techniques, an expendable, small diameter, low cost line array may be constructed. Still another object is that each channel analog signal be sampled simultaneously thus ensuring no time skew thereby simplifying data processing and beamforming by the onboard receiver. These and other objects of the present invention will become apparent when considered in conjunction with the specification and drawings.

These objects are accomplished with the present invention by providing a Sampled Towed Array (STA) Telemetry System combining analog and digital techniques in a Pulse Amplitude Modulated (PAM) telemetry system which uses simple, identical data acquisition modules spaced along a line array. Only two small diameter coaxial cables are used to power all the data acquisition modules, provide timing control and pass data sequentially to a receiver located aboard ship or ashore. The receiver recovers synchronizing pulses, and separates the data samples for data processing or separates the samples according to channel number for parallel analog signal reconstruction. The development of the simultaneous signal sampling, PAM multiplexing, small diameter, two-coaxial cable towed receiving array represents an important improvement in that the employment of simultaneous signal sampling will enable data to be easily presented to conventional beamformers without the need for channel delay corrections. The new feature of this telemetry system is the use of both the leading and the trailing edge of the control (clock) waveform for different purposes. The control waveform leading edge triggers simultaneous sampling at each array module while the trailing edge is delayed at each array module, thereby permitting controlled sequential data output for each channel of data. Using the trailing edge delay feature at each module thus allows simplification of system timing without requiring additional wires. This low cost, small diameter multichannel array can be used to replace existing large diameter arrays where storage, deployment, retrieval or handling becomes impractical, or it may serve as an expendable towed array.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 1 is a block diagram of a representative portion of a sampled towed array telemetry system according to the teachings of subject invention.

FIG. 3 is a block diagram of a typical time delay telemetry module as shown in FIG. 1.

DESCRIPTION OF THE PREFERRED EMBODIMENT

Figure 2:
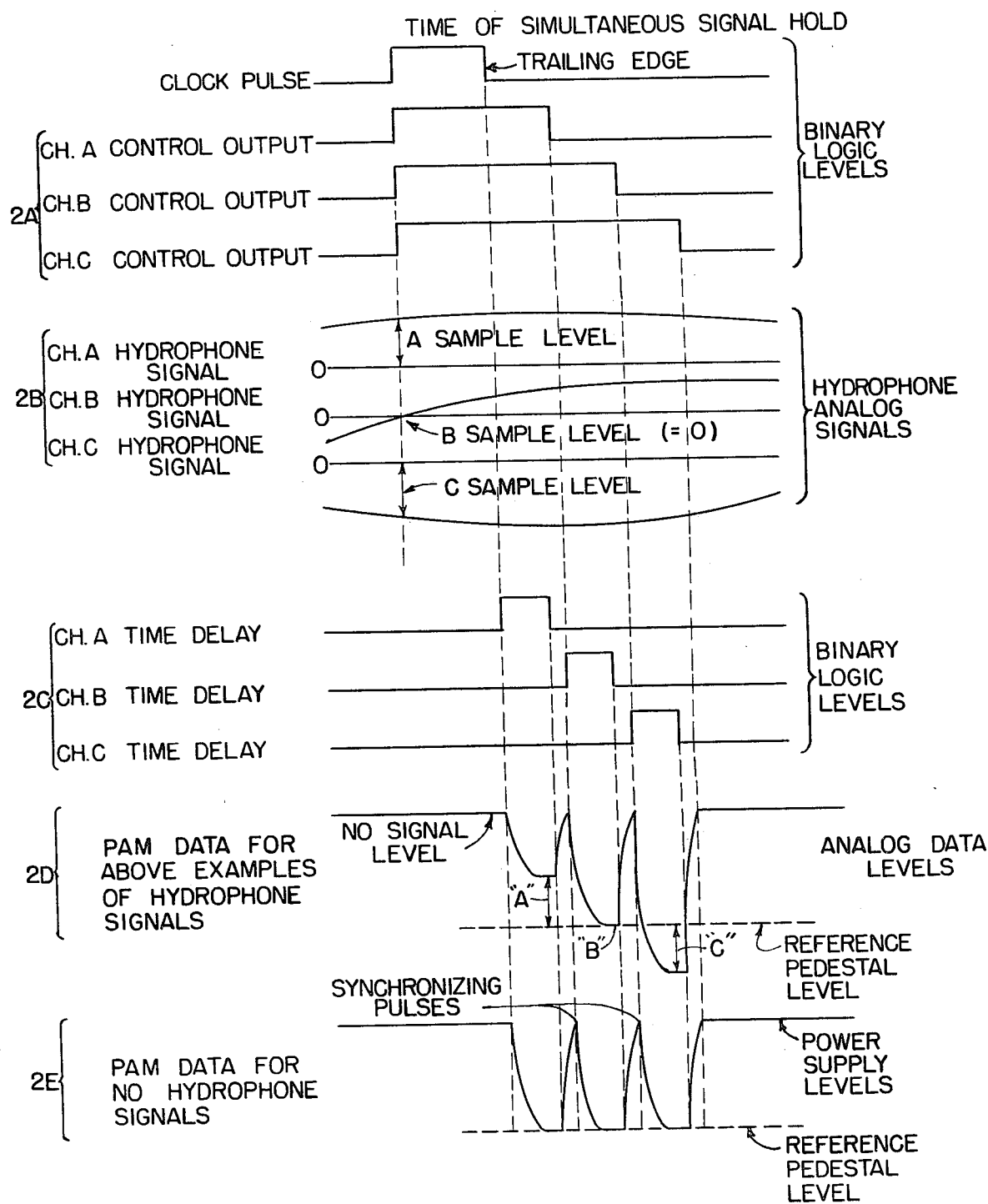
FIGS. 2A-E are graphical representations of the telemetry signal timing and levels.

Referring now to FIG. 1 there is shown a sampled towed array (STA) telemetry system 10 which combines analog and digital techniques to produce pulse amplitude modulated (PAM) data. System 10 comprises a plurality of identical data acquisition modules 12 spaced along a line array. Only two coaxial cables are used to power all the data acquisition modules 12, provide timing control and pass data sequentially to a receiver 14 located aboard ship or ashore. Receiver 14 recovers synchronized PAM pulses, and separates the data samples for data processing or separates the samples according to channel number for parallel analog signal reconstruction. Data acquisition modules 12 are interconnected by two coaxial cables, control cable 16 and data cable 18, forming a multichannel line array. In order to aid in describing the sequential operation of the present invention, the three data modules 12 nearest to clock 20 are identified as modules A, B and C as shown. An appropriate predetermined sampling rate, controlled by clock 20, is used to define the received acoustic bandwidth of interest. It should be noted that the waveforms being sampled are long compared to sampling rate time intervals used. Clock 20 initiates a control pulse which causes each module to simultaneously hold the analog sample level present at its local hydrophone 22. After a short time duration the clock logic level returns to normal and module A passes its analog sample onto the data line for a fixed time duration. Modules B and C repeat this action in sequence. Receiver 14 senses the data pedestal leading edges from each module and generates synchronizing pulses which are counted and used for channel identification of each PAM data pulse. The data pulses then may be converted in the receiver into digital format for data processing. Modules of reduced size, using miniature integrated circuits, may then be connected by coaxial cable and combined with a strength member with an outer jacket to form an extruded plastic small diameter neutrally buoyant array.

FIG. 2A shows the telemetry clock signal and control signals for three contiguous array channels A, B and C representing modules A, B and C respectively. The leading edge of the clock pulse travels the full length of the array without delay causing all array modules to hold analog data sample levels from its hydrophone simultaneously. FIG. 2B shows channel A, B and C's analog hydrophone signals as sensed by modules A, B and C being sampled to obtain sample levels A, B and C at the same time. When the clock pulse trailing edge is sensed by module A, an internal time delay in module A is triggered (see FIG. 2C) causing module A's data output stage to drive the data line for a preselected delay period. The resulting analog PAM voltage pedestal, identified as "A" in FIG. 2D, is the algebraic sum of the unmodulated reference pedestal level (FIG. 2E), and the A sample level being held in module A analog storage. When the channel A data time delay is finished, the data level returns toward the no signal level, generating a preselected synchronizing pulse at which point the control trailing edge is passed on to module B. The above sequence repeats with the zero analog level shown in FIG. 2B for channel B stored as sample level B, thereby causing no change in the reference data pedestal which becomes voltage "B". Finally, module C drives the data line with the algebraic sum of the C sample level adding to the pedestal reference pulse to produce "C" in this case.

FIG. 3 shows an STA time delayed data acquisition module 12 block diagram. Each acquisition module 12 is identical and connects to the array coaxial cables; control cable 16a and 16b and data cable 18a and 18b. Module power is obtained by the potential difference between the two coaxial cable shields via an internal power supply regulator 30. Use of identical, miniature integrated circuits and small diameter lightweight cables results in low array power producing a lightweight, inexpensive array requiring no analog-to-digital converters. Normally the hydrophone signal is conditioned by an amplifier/filter 32 and passed to a signal tracking or holding stage 34 which follows the signal's analog variations. At a chosen point in the signal sampling cycle, the control pulse leading edge is received from the previous module on control cable 16a's central wire and passes directly along to cable 16b. Upon receipt of the leading edge, signal tracking is stopped, and the analog signal value present at stage 34 is held. Later in the signal sampling cycle, reception of the control pulse trailing edge triggers a local time delay stage 36 which in turn causes the data acquisition module to transmit its stored sample level onto the center wire of data cable 18b. This is accomplished by having trailing edge time delay stage 36 cause the sample driver stage 38 to pass the held analog signal to data cable 18b for the chosen time delay duration. After the time delay is completed, sample driver 38 is turned off, tracking-holding stage 34 returns to its tracking mode and the control pulse trailing edge is passed along the center wire of cable 16b to the next data acquisition module which repeats the above sequence of steps.

The signal sampling (clock) rate, the number of channels on the array, the array length and the duration of the data output pedestal are all flexibly interrelated. Normally a value for the most important of these features for a particular application is chosen first, then the other parameters are varied within an acceptable range.

Figure 4:
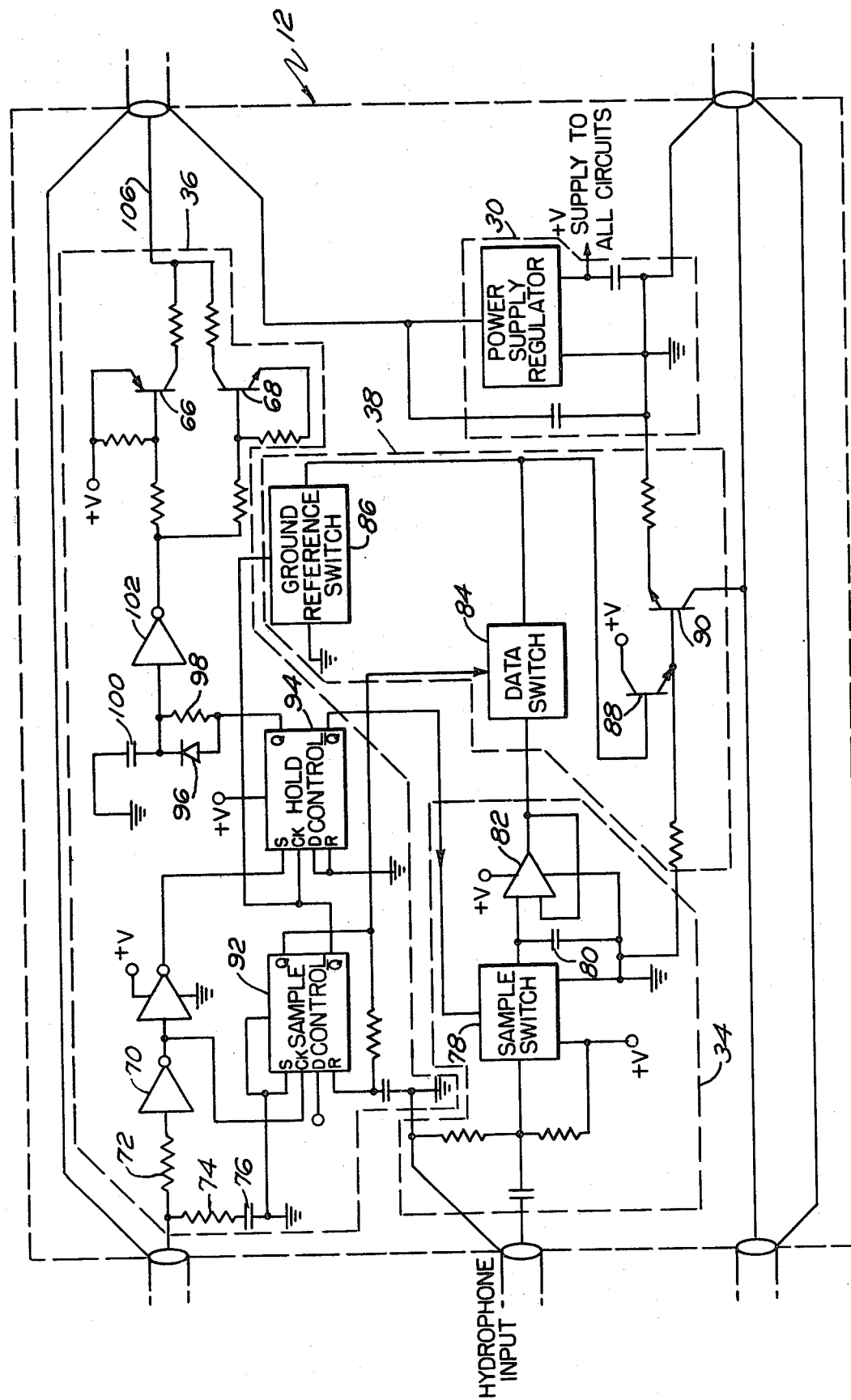
FIG. 4 shows a detail circuit diagram for the time delay telemetry module of FIG. 3.

An embodiment of a detail module logic and sampling circuit is shown in FIG. 4. A three terminal, integrated-circuit, low power voltage regulator 30 holds the module supply at a selected voltage level +V. The logic circuits are complementary symmetry metal oxide (CMOS) integrated circuits. Because such low powered CMOS logic is not capable of directly driving the characteristic impedance coaxial cable, transistors 66 and 68 drive the low impedance control cable connected to the next stage. The incoming control cable drives the logic inverter 70 through a safety resistor 72. This prevents damaging current flow if a logic high is received with no power connected to the module. Series resistor 74 and capacitor 76 provide high speed termination for the cable, yet allow full logic level swing for direct logic coupling without the usual steady-state termination loss. These components greatly reduce terminating resistor power dissipation which otherwise would be high due to the varying control pulse duty cycle. Incoming analog signals from the attached hydrophone normally passes through closed analog sample switch 78 which drives tracking capacitor 80 and operational amplifier 82 here connected as a high input impedance voltage follower. Sample data switch 84 is normally open, blocking the analog signal path. Ground reference switch 86 is normally closed holding the base of transistor 88 at local ground, in order that both transistor 88 and transistor 90 are open and do not drive or load the data cable center wire. When the control input logic level to the module goes high, the clock input to sample control stage 92, a flip-flop, goes low with no effect on stage 92 output while the doubly inverted rise applied to the input of hold control stage 94 causes this flip-flop, 94, to become set. Stage 94's Q output goes high with diode 96 forward-biased to bypass the resister 98/capacitor 100 (RC) time delay; this output drives two cascaded inverting stages, inverter 102 and the transistor cable driver comprising transistors 66, 68 and associated components, and causes output line 106 to go high. Total module delay in passing this control rise is less than 1 μs. When flip-flop 94 is set, its $\overline{Q}$ output causes tracking sample switch 92 to open, such that the analog signal sample level of that hydrophone is retained by hold capacitor 80. When the control input level falls to zero, i.e., the trailing edge, the high set input level on flip-flop 94 is removed, which allows it to be reset later. The clock input to flip-flop 92 through inverter 70 rises, which causes flip-flop 92 to become set. Flip-flop 92 provides a time delay due to the RC feedback to its reset input. During this time delay, ground reference switch 86 is open and sample data switch 84 is closed, driving the base of emitter follower 88 with the held sample level. Transistor 90 then transmits a current, proportional to the held sample, by actually drawing current from the data line. In the absence of a hydrophone signal, the data output stage 38 current pedestal would be midway between the maximum and minimum pedestal limits. Presence of a hydrophone signal modulates the output current pedestal by an amount proportional to the level and polarity of each hydrophone data sample. Drawing these high level, low duty cycle pulses from data cable 18's center wire instead of driving signal current into the cable, greatly reduces regulator 30's current storage requirements and helps keep module power low. Average current required for the sampling and logic circuits is only a few mA. At the end of the time delay, flip-flop 92 resets itself which causes analog switches 84 and 86 to respectively block and pass signal and turn off the data line drive. Also, flip-flop 94's clock input goes high, causing it to reset because its D input is grounded. Its $\overline{Q}$ output closes analog switch 78 so the acoustic signal can be tracked again. The Q output of flip-flop 94 goes low, drives the input of inverter 102 via the RC time delay, and introduces a synchronizing pulse delay between samples. After this short delay, the control output line is pulled low which causes the next module to drive the data cable with its held sample. This operating cycle continues in sequential module order.

Advantages of the sample towed array telemetry system over the prior art are: (a) simultaneous sampling of all array modules followed by sequential PAM data transmission to the receiver; (b) all array modules are identical and are wired into the array in the same way to reduce the cost and time required for construction, sparing and repairing of the array, (c) analog and digital circuits are each used where best suited to keep expected array power low per channel; (d) the PAM signals received from the array are easily interfaced to a serial analog-to-digital converter, resulting in frames of digitized signals without time skew; (e) use of only two small diameter coaxial telemetry cables in the array.

The crucial new feature of this telemetry is the use of both leading and trailing edges of the control (clock) waveform for different purposes. The control leading edge allows simultaneous sampling at each array module while the trailing edge is delayed at each array module, thus allowing for controlled sequential data output for each channel of data. This trailing edge delay feature at each module allows simplification of system timing without requiring additional wires.

What has thus been described is a Sampled Towed Array Telemetry System combining analog and digital techniques in a Pulse Amplitude Modulated Telemetry System which uses simple, identical data acquisition modules spaced along a line array. Only two small diameter coaxial cables are used to power all the data acquisition modules, provide timing control and pass data sequentially to a receiver located aboard ship or ashore. The receiver recovers synchronizing pulses, and separates the data samples for data processing or separates the samples according to channel number for parallel analog signal reconstruction. The development of the simultaneous signal sampling, PAM multiplexing, small diameter, two-coaxial towed receiving array represents an important improvement in that the employment of simultaneous signal sampling will enable data to be easily presented to conventional beamformers without the need for channel delay corrections. The new feature of this telemetry system is the use of both the leading and the trailing edges of the control (clock) waveform for different purposes. The control waveform leading edge triggers simultaneous sampling at each array module while the trailing edge is delayed at each array module, thereby permitting controlled sequential data output for each channel of data. Using the trailing edge delay feature at each module thus allows simplification of system timing without requiring additional wires. This low cost, small diameter multichannel array can be used to replace existing large diameter arrays where storage, deployment, retrieval or handling becomes impractical, or it may serve as an expendable towed array.

Obviously many modifications and variations of the present invention may become apparent in light of the above teachings. For example: An alternate power source such as an RTG (Radiosotype Thermoelectric Generator) or a battery can be used instead of power from ship via cable. A fixed receiving installation can be used with cabling to shore instead of power from ship via cable. The clock package can be located at either end of the array or even at the signal receiving location. Hydrophones can be small conventional types, new semiconductor units or long flexible continuous units such as newly developed polymer hydrophones. Array telemetry can be twisted pairs or other wire configurations instead of the two described coaxial cables. Fiber optics can be substituted for the wired PAM telemetry system to further reduce array weight and diameter. The power supply polarity can be reversed or a variation made in the ground reference point. The control logic levels can be reversed for sensing the controlled sample time and sequential data signal driving time.

In light of the above, it is therefore understood that within the scope of the appended claims, the invention may be practiced otherwise than as specifically described.

What is claimed is:
1. A towed array telemetry system comprising:
 a plurality of sensing means, spaced at preselected intervals along said towed line array, for receiving incoming acoustic signals and converting said acoustic signals into proportional analog electrical signals;

a plurality of data acquisition modules corresponding and connected to said plurality of sensing means, for receiving said proportional analog electrical signals from said plurality of sensing means, continuously tracking said plurality of proportional analog electrical signals, simultaneously holding the instant voltage levels of said plurality of proportional analog eletrical signals at said plurality of data acquisition modules on command and transmitting said plurality of voltage levels as a series of pulse amplitude modulated data signals;

timing means, adapted to produce a control pulse having leading and trailing edges, for controlling said simultaneous voltage level holding at said plurality of data acquisition modules and the serial transmitting of said held voltage levels at said plurality of data acquisition modules as said pulse amplitude modulated data signals;

receiving means for receiving said serial pulse amplitude modulated data signals from said plurality of data acquisition modules, counting said pulses to provide data channel identification and processing said signals in a form suitable for beamforming;

control cable means for serially connecting said timing means, said plurality of data acquisition modules, and said receiving means together respectively;

data transmission cable means, being generally parallel to said control cable means, for serially connecting said plurality of data acquisition modules and said receiving means, said data transmission means providing the path over which said pulse amplitude modulated signals are transmitted; and power supply means for providing power to operate said timing means, said plurality of data acquisition modules and said receiving means.

2. A towed array telemetry system according to claim 1 wherein each of said plurality of sensing means further comprises:
   a hydrophone; and
   an amplifier/filter circuit connected to said hydrophone for amplifying and filtering said proportional analog electrical signals.

3. A towed array telemetry system according to claim 2 wherein each of said plurality of data acquisition modules further comprises:
   a trailing edge time delay stage wherein said leading edge of said timing means control pulse is immediately passed to the next successive data acquisition module while the trailing edg of the control pulse is delayed for a preselected time before transmittal to the next successive module;
   a sample tracking or holding stage wherein said proportional analog electrical signal tracking continues while a low logic state exists on said control cable means until a high state due to said control pulse leading edge causes the instant hydrophone signal level to be held;
   a sample driver connected to said data transmission cable means for receiving and outputting said held signal level received from said tracking or holding stage during said preselected time delay; and
   a power supply regulator for distributing relatively low power from said power supply means to said sample driver.

4. A towed array telemetry system according to claim 3 wherein said timing means further comprises a clock.

5. A towed array telemetry system according to claim 4 wherein said control cable means further comprises a small diameter coaxial cable.

6. A towed array telemetry system according to claim 5 wherein said data transmission cable means further comprises a small diameter coaxial cable.

* * * * *